(12) United States Patent
Ruemeli

(10) Patent No.: US 6,463,713 B1
(45) Date of Patent: Oct. 15, 2002

(54) APPARATUS FOR MANUFACTURING AND PACKAGING PRODUCTS IN ROLL FORM

(75) Inventor: Robert Ruemeli, Sundhoffen (FR)

(73) Assignee: Georgia-Pacific France, Kunheim (FR)

( * ) Notice: Subject to any disclaimer, the term of this patent is extended or adjusted under 35 U.S.C. 154(b) by 0 days.

(21) Appl. No.: 09/412,580

(22) Filed: Oct. 5, 1999

(30) Foreign Application Priority Data

Oct. 6, 1998 (FR) .............................................. 98 12471

(51) Int. Cl.[7] .............................................. B65B 19/28
(52) U.S. Cl. .............................. 53/52; 53/202; 198/442; 198/437
(58) Field of Search ................................ 198/437, 444, 198/442; 53/52, 154, 153, 151, 202

(56) References Cited

U.S. PATENT DOCUMENTS

| 3,615,001 A | * | 10/1971 | Temple |
| 4,440,289 A | * | 4/1984 | Weis |
| 5,161,665 A | * | 11/1992 | Cragun |
| 5,186,306 A | * | 2/1993 | Sjostrand |
| 5,551,209 A | * | 9/1996 | Molina et al. |
| 5,566,526 A | * | 10/1996 | Suga |
| 5,638,938 A | * | 6/1997 | Lazzarotti et al. |
| 5,782,332 A | * | 7/1998 | Guidetti et al. |
| 5,944,165 A | * | 8/1999 | Mannlein et al. |
| 6,131,720 A | * | 10/2000 | Heuft et al. |

* cited by examiner

*Primary Examiner*—Eugene Kim
(74) *Attorney, Agent, or Firm*—Breiner & Breiner, L.L.C.

(57) ABSTRACT

Mass manufacturing and packaging apparatus (10) of products in roll form, in particular paper products including, from upstream to downstream, a cutting station (12) for cutting very long consecutive logs (20) of a specified diameter into consecutive sequences of several rolls (22) of shorter length, and an upstream conveyor (14) to move the sequences of rolls (22) from the cutting station (12) to a feeder station (16) distributing the rolls (22) to several automated packaging stations (18) characterized in that a roll-switching system (26, 37) of the feeder station (16) allows directing each sequence of rolls (22) toward a specific set of packaging stations (18) which is different from the set towards which the previous sequence of rolls (22) was directed.

6 Claims, 3 Drawing Sheets

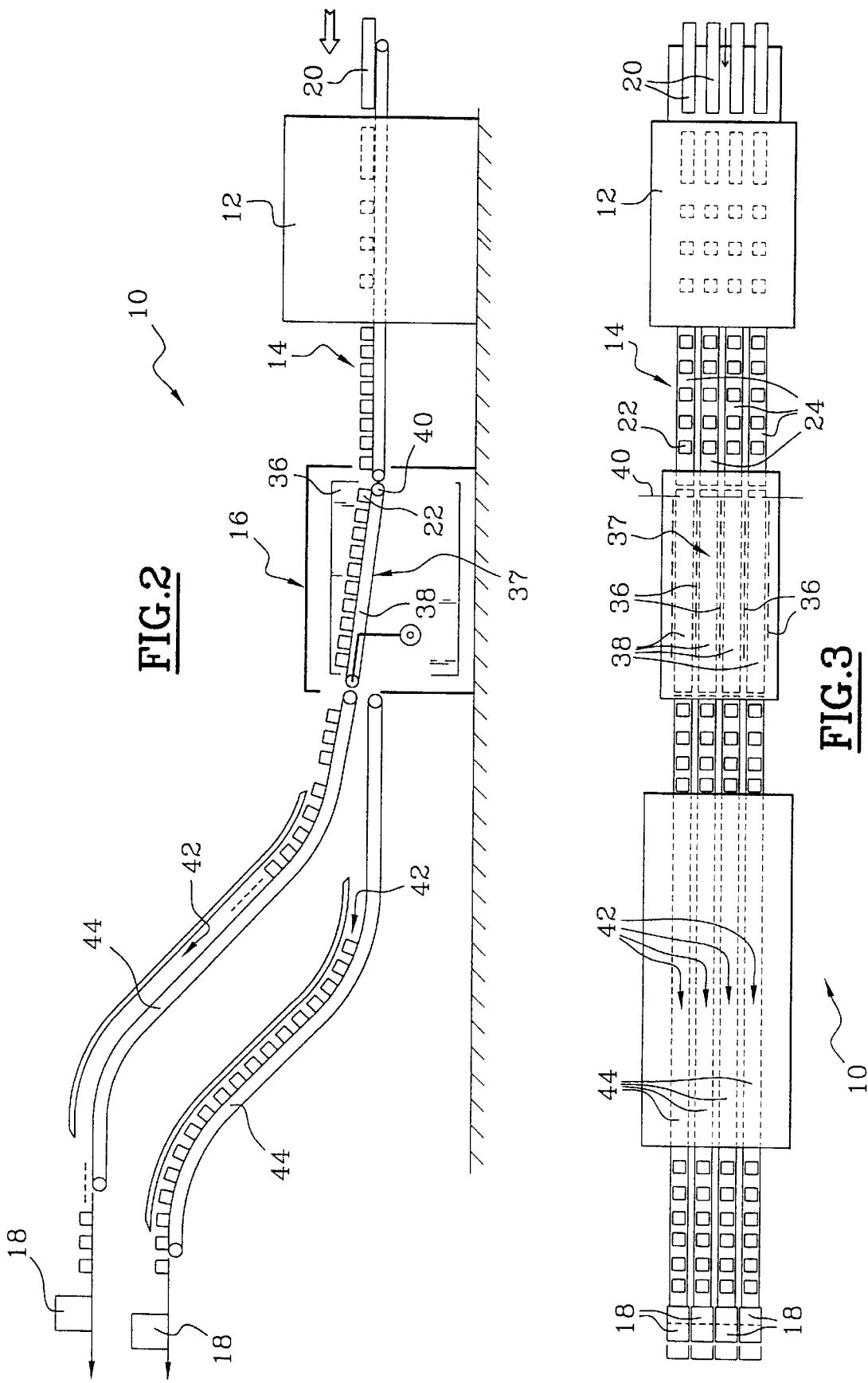

APPARATUS FOR MANUFACTURING AND PACKAGING PRODUCTS IN ROLL FORM

Figure 1:
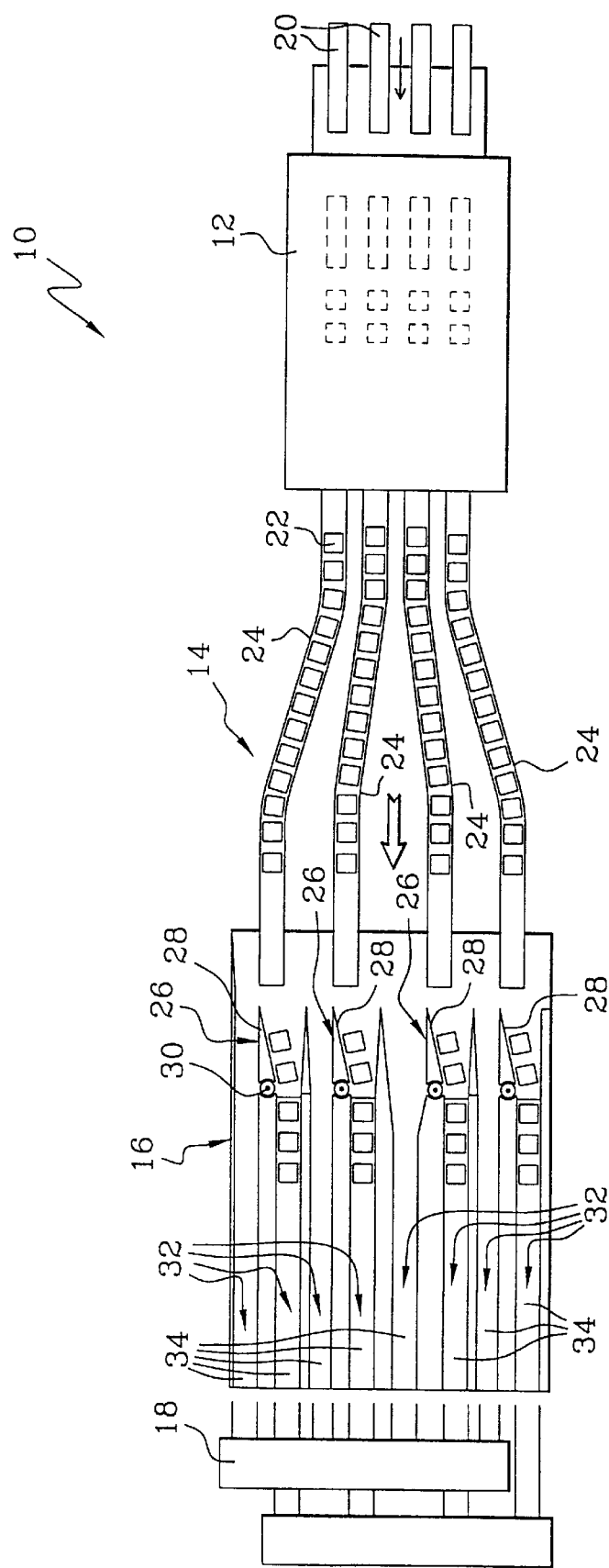

The present invention relates to manufacturing and packaging apparatus.

In particular, the invention concerns mass production and mass packaging apparatus for roll products, especially for tissue paper or absorbent cellulosic rolls used for sanitary or household purposes. The apparatus includes, from upstream to downstream, a cutting station to cut consecutive, very long rolls of a given diameter into sequences, spaced or not, of several shorter rolls, furthermore, an upstream conveyor to move the roll sequences from the cutting station to a feeder station which distributes the rolls, sequence after sequence, to several automated packaging stations.

Many designs of apparatus for manufacturing roll products for sanitary or household uses are already known.

Such apparatus is based on the principle of simultaneously implementing all the roll manufacturing stages in a single fabrication line, from loading very long rolls called "logs" to the packaging of the rolls cut into smaller sizes.

There are many kinds of cutting stations. Overall they use band saws or circular saws to ensure regular log cutting and final roll cutting.

Beyond the cutting station, the roll sequences made from the logs are conveyed to one or more packaging stations.

In general, a problem arises when moving the rolls from a cutting station to a packaging station because the known apparatus incur the drawback of being susceptible to roll accumulation, even "pile-up", whereby the manufacturing apparatus may be stopped.

To prevent the as yet unpackaged rolls from accumulating in the conveyance system, a feeder station already has been used at the exit of the cutting station to distribute the as yet unpackaged rolls between several packaging stations.

In general, the feeder stations thusly combined with the conveyance system include a selector to direct the rolls toward several downstream conveyors each leading to a packaging station.

Such a design may be embodied by a feeder station similar to that described in U.S. Pat. No. 4, 440, 289.

The feeder station of this patent is integrated into an upstream conveyor which is a central moving belt above which is mounted a flap rotatable about an axis parallel to the longitudinal direction of the central moving belt and able to drive the rolls to either side of the moving belt in the direction of several downstream conveyors to distribute and balance the permissible load of rolls across the packaging stations.

Such a design, however, incurs several major drawbacks.

The feeder station is able to move only a limited number of rolls simultaneously, the central belt temporarily stopping each roll opposite the flap prior to the roll being discharged, whereby the overall roll conveyance speed in the manufacturing apparatus is lowered. Moreover, the rolls are susceptible to being warped or soiled by their direct contact with the flap and, if so, may represent a significant commercial loss.

To remedy this condition, the present invention provides a feeder station eliminating contact between it and the rolls and, therefore, leaving unimpaired the roll conveyance speed in the manufacturing apparatus.

For that purpose, the invention provides manufacturing apparatus of the above described type which is characterized in that a feeder station roll-switching system allows orientation of each roll sequence toward a specific set of packaging stations, where the orientation is different from that toward which the previous sequence had been directed.

In other features of the invention:

the upstream conveyor is substantially horizontal and independently drives the roll sequences in a given direction at a higher speed than that of the sequences leaving the cutting station in order to separate the sequences at a minimum spacing to ease their switching, the roll-switching system includes a set of vertical blades which can simultaneously rotate about mutually parallel vertical shafts spaced apart by the width of one roll and able to take up, from one roll sequence to the next, two distinct angular positions relative to the conveyor's direction of advance for the purpose of orienting the rolls of one sequence toward one set or another of downstream conveyors relating to the oriented angular position, the downstream conveyors moving the rolls toward a set of packaging stations associated with the oriented angular position, the roll-switching system includes a set of stationary and parallel vertical plates spaced apart by the width of one roll and coplanar intermediary conveyors rotatable about a horizontal axis are perpendicularly configured between the plates and are able to simultaneously assume from one roll sequence to the next two different angular positions to orient the rolls of one sequence toward either of the two downstream sets of conveyors arrayed at two levels, each downstream conveyor set associated with each oriented angular position moving the rolls toward a set of packaging stations associated with the oriented angular position, the manufacturing apparatus includes a control unit receiving data from components of the apparatus and controlling other components of the apparatus, the control unit receives a signal denoting the speed of the rolls leaving the cutting station and a transit signal from the roll sequences, the control unit calculates the distance between two consecutive roll sequences and, thereupon, driven by an internal program, controls the angular position of the blades or of the intermediary conveyors and the speed of the upstream conveyor.

Other features and advantages of the invention are elucidated in the comprehensive description below and in the didactic relation of the attached drawings.

Figure 4:
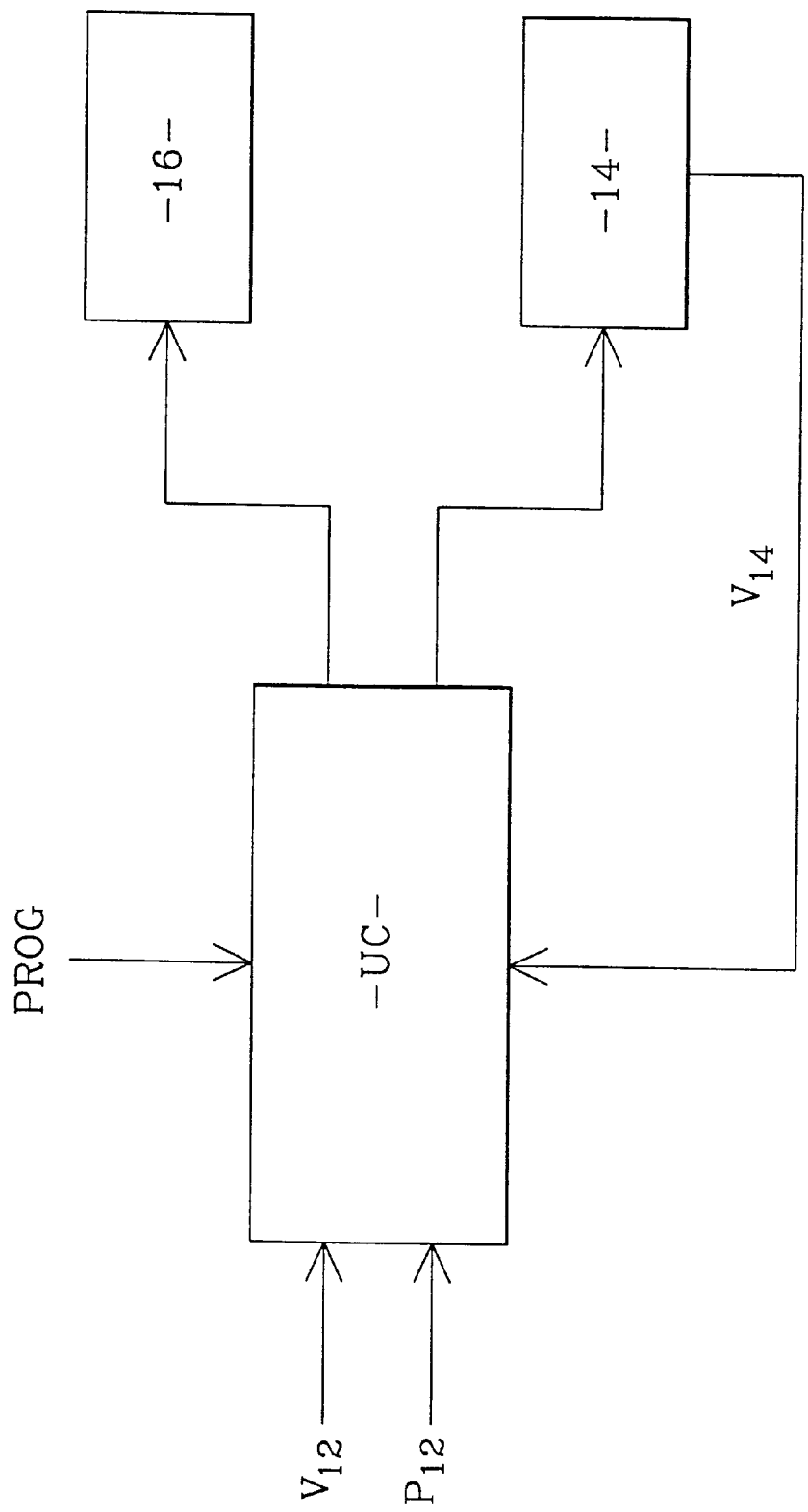

FIG. 1 is a schematic top view of manufacturing apparatus of a first embodiment of the invention including a horizontal feeder station, FIG. 2 is a schematic side view of manufacturing apparatus of a second embodiment of the invention including a vertical feeder station, FIG. 3 is a top view of manufacturing apparatus as shown in FIG. 2, and FIG. 4 is a functional block diagram of a control unit of the manufacturing apparatus.

In the description below, identical reference numbers denote identical parts or parts having similar functions.

FIG. 1 shows a first embodiment of the invention of the apparatus 10 for mass manufacturing and packaging roll products.

In a conventional manner, the apparatus 10 includes a cutting station 12, an upstream conveyor 14, a feeder station 16, and automated packaging stations 18.

When mass producing rolls, in particular rolls of absorbent cotton and in a manner of the shown embodiment, four "logs" 20 of absorbent cotton are inserted in parallel in the direction of the arrow upstream of the cutting station 12 wherein they are sequenceed into rolls 22 of the same diameter but of lesser lengths.

The rolls 22 leave the cutting station 12 in spaced sequences each corresponding to the cutting of one log 20. The sequences of adjacent rolls 22 are moved by the conveyor 14 to a feeder station 16 that directs them toward packaging stations 18 constituting the final manufacturing stage prior to shipping packs of rolls 22.

Illustratively, the cutting station 12 is a saw including several cutting disks or a band saw with several cutting bands, allowing cutting of the logs 20 into rolls 22.

In the invention, the conveyor 14 (shown in top view in FIG. 1), is substantially horizontal and includes adjacent conveyance lines 24, each conveyance line 24 picking up the rolls 22 leaving the cutting station 12 to move them toward the feeder station 16.

Each conveyance line 24 is associated with rolls 22 that always assume a given longitudinal position when leaving the cutting station 12.

The conveyor 14, therefore, may advantageously include of a set of conveyance lines 24 in the form of moving belts or continuous (scaly) conveyors, motor-driven cylinder conveyors, or any other system of conveyance.

For mass production, the cutting station 12 will continuously cut the logs 20 whereby a log 20 immediately follows another inside the cutting station 12. As a result, the sequences of rolls 22 exiting the cutting station 12 follow one another tightly, spaced apart or not, depending on the cutting design.

In the invention, the conveyor 14 moving the sequences of rolls 22 from the exit of the cutting station 12 to the intake of the feeder station 16 is advantageously driven at a controlled speed to maintain, and where called for, to provide sufficient spacing between two consecutive roll sequences in the vicinity of the roll-switching system 28.

The spacing between the sequences of rolls 22, whether inherent or adjusted, is used to drive the roll-switching system. Accordingly, no product is touched by the switching means and the flow regularity remains unaffected.

Advantageously, the feeder station 16 includes a roll-switching system 26 making it possible to direct each sequence of rolls 22 toward a specific set of packaging stations 18 different from that to which the preceding sequences of rolls 22 was sent. For that purpose, each roll-switching system 26 includes a pair of rotatable vertical blades 28 able to assume at least two different angular positions.

For that purpose, the blades 28 pivot about parallel vertical shafts 30 and, in the preferred embodiment of the invention, the blades 28 are mutually parallel and are simultaneously rotatable about the shafts 30 between two predetermined distinct angular positions. This configuration does not restrict the invention and the blades 28 also may assume three or more predetermined angular positions.

In another embodiment of the invention, the blades are mounted downstream of their pivot shafts. This configuration is more advantageous when each flow must be distributed to more than two paths.

The vertical blades 28 define the accesses to the paths 32 which direct the rolls 22 toward the packaging stations 18 in the longitudinal direction of the advance of the consecutive rolls. Therefore, when the feeder station 16 is operational a sequence of rolls 22 may be directed toward a set of paths 32 different from the set of paths 32 associated with the previous sequence of rolls 22, and as a result the sequence of rolls 22 are directed toward a packaging station 18 different from that to which the previous roll sequence was directed, each roll being guided between two parallel blades 28.

Downstream of the roll-switching system 26, the paths 32 each include a downstream conveyor 34 associated with a packaging station 18. Advantageously, the downstream conveyors 34 also constitute moving belts, or motor-driven rollers, .or any other conveyance means.

FIGS. 2 and 3 illustrate a second embodiment of the invention wherein the feeder station 16 implements the orientation of the sequences of rolls 22 between two packaging stations 18 which no longer are situated in one horizontal plane as described above in relation to FIG. 1 but which are mounted vertically at two different levels.

Similarly to the case of the first embodiment, the manufacturing apparatus 10 includes a cutting station 12 and the upstream conveyor 14 includes conveyance lines 44 moving the rolls 22 at a speed which is regulated relative to the speed of the rolls 22 when leaving the cutting station 12.

In the manner of the invention and similarly to its first embodiment, the feeder station 16 includes a roll-switching system 37 which includes a moving conveyor of a set of stationary vertical parallel and longitudinal plates 36 spaced apart by the width of a roll 22 to allow guiding the rolls 22 in the longitudinal direction of advance of the flow of rolls 22. Intermediary and coplanar conveyors 38 are mounted between those vertical plates 36 and perpendicularly to them and are simultaneously rotatable as a set about a horizontal axis 40, as a result of which the intermediary conveyors 38 can simultaneously assume at least two different distinct angular positions from one sequence of rolls 22 to the next. This design is not restrictive with respect to the invention and the set of conveyors 38 may also assume more than two predetermined angular positions.

As a result, and similarly to the case described in relation to the embodiment of FIG. 1, when exiting the feeder station 16, a sequence of rolls 22 can be directed by the roll-switching system 37 toward a set of paths 42 different from that followed by the preceding sequence of rolls 22, each path 42 being, similar to the case described in relation of the first embodiment, constituted by a downstream conveyor 44 in the form of a moving belt, by a line of motor-driven rollers, or any other conveyance means. Each set of paths 42 moves the rolls 22 toward two packaging stations 18.

Advantageously, this second embodiment allows substantially reducing the ground area required by such manufacturing apparatus 10 compared with the ground area required in the first embodiment.

Advantageously, the invention is not restricted to a single feeder station 16 and several consecutive feeder stations 16 can be combined to increase the number of available packaging stations 18, whereby the manufacturing rate of the rolls 22 will be increased. Illustratively, two feeder stations 16 of the same kind can be combined leading, for the first embodiment, to an increase in ground area taken up by the manufacturing apparatus 10, and, as regards the second embodiment, to greater vertical bulk of the manufacturing apparatus 10. It being furthermore possible to combine two different kinds of feeder stations 16.

One vertically distributing vertical feeder station 16 can be combined with two horizontally distributing packaging stations 18 in order to achieve two level manufacturing apparatus 10 of high output capacity.

The diagram of FIG. 4 shows the principle of a control unit CU of the manufacturing apparatus 10. In a conventional manner, the control unit CU may be driven by an operational program PROG of the manufacturing apparatus 10. The control unit CU receives data from the cutting station 12, for example a signal $V_{12}$ denoting the exit speed of the sequences of rolls 22 leaving the cutting station and, each time a sequence of rolls 22 leaves the cutting station 12, a transit signal $P_{12}$. Depending on the signals $V_{12}$ and $P_{12}$ and on the program PROG, the control unit CU calculates the distance between two consecutive sequences of rolls 22 and controls the feeder station 16, as a function of the embodiment, by acting either on the position of the roll-switching system 26 or on the position of the roll-switching system 37 and the speed of the upstream conveyor 14, in order to adjust or to maintain the appropriate spacing between two sequences of rolls 22. Furthermore, the upstream conveyor 14 is able to send back a signal $V_{14}$ denoting the speed of the transiting sequences of rolls 22 in order that the control unit CU may implement real time automatic control of the feeder station 16 and of the upstream conveyor 14. As a result, the control unit CU is both a continuous control and a monitoring means of the manufacturing flow of the rolls 22.

What is claimed is:

1. A mass manufacturing and packaging apparatus of products in roll form comprising, from upstream to downstream, a cutting station to cut consecutive logs of a first length and of a first diameter into consecutive sequences of a plurality of adjacent rolls of a second length which is less than the first length, and at least one upstream conveyor to move the sequences of rolls following one another from the cutting station to a feeder station to stations, wherein a roll-switching system of the feeder station directs as a continuous flow each said sequence of rolls to a packaging station which is different from a packaging station toward which a preceding sequence of rolls was directed, and wherein the upstream conveyor is substantially horizontal and independently drives a sequence of rolls into a predetermined direction at a controlled speed relative to a speed of sequences leaving the cutting station in order to separate or to keep the sequences at a minimum mutual spacing to ease switching of the sequences, wherein the roll-switching system comprises a set of vertical blades simultaneously rotatable about mutually parallel vertical shafts capable of assuming, from one sequence of rolls to a next sequence of rolls, two or more distinct angular positions relative to a direction of advance of the upstream conveyor in order to direct rolls of one sequence towards a predetermined set of downstream conveyors, said set being associated with a predetermined angular position of a vertical blade, the downstream conveyors moving the rolls toward packaging stations associated with the angular position.

2. A mass manufacturing and packaging apparatus of products in roll form comprising, from upstream to downstream, a cutting station to cut consecutive logs of a first length and of a first diameter into consecutive sequences of a plurality of adjacent rolls of a second length which is less than the first length, and at least one upstream conveyor to move the sequences of rolls following one another from the cutting station to a feeder station to distribute the rolls to at least two automated packaging stations, wherein a roll-switching system od the feeder station directs as a continuous flow each said sequence of rolls to a packaging station which is different from a speed relative to a speed of sequences leaving the cutting station in order to separate or to keep the sequence at a minimim mutual spacing to ease switching of the sequences; wherein the roll-switching system comprises a set of guides in the form of parallel stationary vertical plates spaced apart by a width of one roll and between which are perpendicularly configured coplanar intermediary conveyors rotatable about a horizontal axis and able to simultaneously assume, from one sequence of rolls to a next sequence of rolls, two or more different angular positions in order to orient the rolls of a sequence toward either of two sets of downstream conveyors arranged at two different levels, each set of downstream conveyors being associated with each angular position to move the rolls toward a set of packaging stations associated with the angular position.

3. Manufacturing and packaging apparatus as claimed in either of claim 1 or 2, further comprising a control unit which receives data from components of the manufacturing apparatus and controls operation of other components of said apparatus.

4. Manufacturing and packaging apparatus as claimed in claim 3, wherein the control unit receives at least one signal denoting speed of the rolls when leaving the cutting station and a transit signal relating to movement of the sequences of rolls.

5. Manufacturing and packaging apparatus as claimed in claim 3, wherein the control unit calculates distance between two consecutive sequences of rolls and is driven by an internal program to control the angular position of the blades or speed of intermediary conveyors and the upstream conveyors.

6. Manufacturing and packaging apparatus as claimed in claim 4, wherein the control unit calculates distance between two consecutive sequences of rolls and is driven by an internal program to control the angular position of the blades or speed of intermediary conveyors and the upstream conveyors.

* * * * *

UNITED STATES PATENT AND TRADEMARK OFFICE
CERTIFICATE OF CORRECTION

PATENT NO.     : 6,463,713 B1                                            Page 1 of 1
DATED          : October 15, 2002
INVENTOR(S)    : Robert Ruemeli It is certified that error appears in the above-identified patent and that said Letters Patent is hereby corrected as shown below:

Column 4,
Line 5, "rollers, . or" should read -- rollers, or --.

Column 5,
Line 26, after "feeder station to" insert -- distribute the rolls to at least two automated packaging --.

Column 6,
Line 8, "system od" should read -- system of --.
Line 10, after "different from a" insert -- packaging station toward which a preceding sequence of rolls was directed, and wherein the upstream conveyor is substantially horizontal and independently drives a sequence of rolls into a predetermined direction at a controlled --.

Signed and Sealed this

Eighteenth Day of February, 2003

JAMES E. ROGAN
*Director of the United States Patent and Trademark Office*